July 1, 1941.    R. POLK, SR., ET AL    2,247,589
TOOL FOR SEGMENTING CITRUS FRUITS
Original Filed April 13, 1938
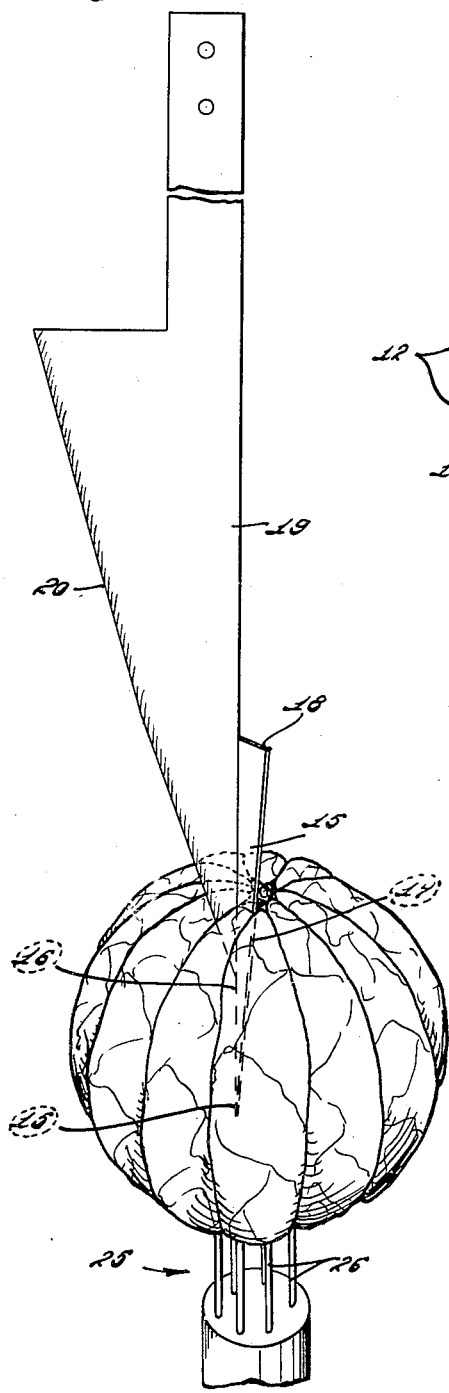
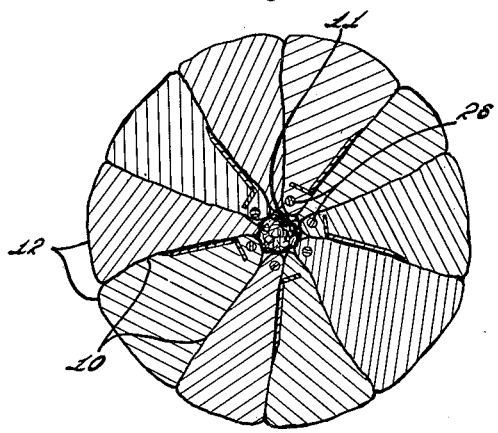
INVENTOR.
BY Ralph Polk Sr. and
Ralph Polk Jr.,
ATTORNEYS.

Patented July 1, 1941

2,247,589

UNITED STATES PATENT OFFICE 2,247,589

TOOL FOR SEGMENTING CITRUS FRUITS

Ralph Polk, Sr., Miami, and Ralph Polk, Jr., Haines City, Fla., assignors to The Polk Development Company, Tampa, Fla., a copartnership Original application April 13, 1938, Serial No. 201,732. Divided and this application June 7, 1939, Serial No. 277,847

3 Claims. (Cl. 146—3)

This application is a division from our copending application Serial No. 201,732 which has matured in part as Patent 2,199,345, April 30, 1940 and relates to the subject matter illustrated in Fig. 8 of that application.

The present invention relates to a tool which may be manipulated either independently or as one of a circular group to penetrate a juice-cell-group of a citrus fruit by movement parallel with the axis or core of the fruit, in such manner as to incise the juice-cell-group in a plane substantially at right angles to the bisecting radial plane of the juice-cell-group at a distance radially spaced from the apex of the group juice outside of the region where seeds occur and to break the bond between one radial face of the juice-cell-group and the integument bonded thereto without substantial rupture of the juice cells which make up the aforesaid radial face, and without rupturing the radially extending bonded integuments.

The accompanying drawing illustrates our invention.

Fig. 1 is a perspective view of our improved tool in conjunction with a peeled fruit into which the tool is to be projected; and Fig. 2 a transverse section of a peeled fruit and a plurality of our tools partially projected through the fruit.

In the drawing 10—10 indicate the radially extending portions of the integument within which the juice-cell-groups of the citrus fruit are contained, said portions springing from the apex 11 and continuing somewhat thinner than the circumferential integument portions 12.

As is well known, each juice-cell-group is contained within a sack of integument having the form of a spherical-segment, the radiating portions and apex of the segment being quite tough while the circumferential portion is rather fragile. These spherical-segment sacks are bonded together by adherence between adjacent radially extending integument portions. In seeded fruits the seeds occur in the juice-cell-groups in the region close to the apex of the segment and in seedless fruit the volume of meat within the apex region is comparatively small and negligible from a packing standpoint. For packing purposes it is desirable to obtain from each fruit as many substantially whole integument free juice-cell-groups as possible, but these segments must be seed free. The segments vary considerably, as to the included angle, and the radiating integuments are rarely truly radial.

In order to obtain substantially whole integument free juice-cell-groups, the preliminary step of breaking the bond between one radial face of each juice-cell-group and its inherent integument is quite desirable and our present tool is designed to accomplish that purpose without rupture of the radially extending integuments and without rupture of the bond between adjacent radially extending integuments.

To that end, our tool comprises a supplemental blade or tip portion 15 having a straight edge 16 and an inclined edge 17 with a maximum width 18 approximating the transverse dimension of an average fruit section at a distance spaced from the axis of the fruit just beyond the zone where seeds occur in seeded fruit. The edges 16 and 17 are of such character as to be incapable of cutting the radial integuments of the fruit and the blade is preferably quite thin so as to be capable of readily penetrating the meat of the fruit. It may be somewhat thinned to a downward taper at its lower end or tip to facilitate pentration. Attached to or integral with the supplemental blade 15 along the upper portion of its edge 16 is a main stripper blade 19 which lies in a plane at an angle from the plane of tip 15 equal approximately to 90° plus one-half of the included angle of an average fruit segment. The tip of the blade 19 lies at about half the height of blade 15 and the blade 19 has a maximum width, at its upper end, somewhat greater than the radial extent of the juice-cell-group of the fruit to be acted upon. The rear edge of blade 19 is parallel with the plane of blade 15 and is blunt, while the tapered edge 20 is sharpened by beveling towards the outer face of the blade.

When this tool is projected into a citrus fruit along a line parallel with the axis of the fruit, the lower point or tip 15' of blade 15 readily penetrates the relatively fragile circumferential integument of a juice-cell-group somewhere between the two radial portions of the integument and in a region just beyond the normal seed region. As the tool penetrates the juice-cell-group, one or the other of the edges 16 and 17 of the supplemental blade 15 will encounter one of the radial integuments so that before the tool has greatly penetrated the juice-cell-group, the blade 19 will be positioned against the inner face of one of the radial integuments so that further penetration of the tool will, by reason of the sharpened inclined edge 20 of blade 19, sever the bond between one radial face of the penetrated segment and the radial integument bonded thereto.

The above-described tool may be used by hand to considerable advantage but it is more efficient when used as one of a circular group of similar tools, the number in the group being generally approximately half the number of segments to be found in the fruit being operated upon. The blades 19 are laterally flexible and the peeled fruits are supported upon a fork 25 having a plurality of prongs 26 arranged in circular series and a diameter such that the prongs penetrating the fruit in a direction opposite to the direction of penetration of the tools, lie within the apices of the radiating integuments, the fork thus supporting the fruit against the penetration of the tools and the prongs holding the radial integuments against outward displacement under the stresses produced by the inclined edges 20 of the blades 19.

After the major portion of the segments of a fruit have had broken the bond between one face and the adjacent radial integument, complete separation of integument free juice-cell-groups may be attained in various ways, preferably by centrifugal action such as is described in our above-mentioned parent application.

We claim as our invention:

1. A tool for rupturing the natural bond between one radial face of a juice-cell-group of a fruit of the citrus type and the adherent radial integument, comprising a thin main blade and a supplemental blade adjacent the tip of the main blade, said main blade and supplemental blades being parallel to a common straight axis with their two planes in the neighborhood of 90° apart, the main blade having a maximum width approximating radial dimension of citrus fruit and a length greater than the diameter of such fruit, and the supplemental blade having a width slightly less than the distance between the two radial integuments of a fruit segment closely outside the normal seed area, whereby said supplemental blade may enter polarwise into said fruit segment without rupture of said integuments.

2. A tool of the character specified in claim 1 wherein the tip of the supplemental blade projects beyond the tip of the main blade and the supplemental blade is width-tapered.

3. A tool of the character specified in claim 1 wherein the tip of the supplemental blade projects beyond the tip of the main blade, and the main blade, clear of the supplemental blade, has a length exceeding the diameter of the fruit.

RALPH POLK, Sr.
RALPH POLK, Jr.